Oct. 30, 1923.

J. M. LA COURSE

PISTON RING

Filed Jan. 5, 1920

1,472,073

Witnesses:
W. F. Kilroy
Harry R. L. White

Inventor:
Joseph Maurice La Course
By Hiee & Hiee
Attys.

Patented Oct. 30, 1923.

1,472,073

UNITED STATES PATENT OFFICE.

JOSEPH MAURICE LA COURSE, OF CHICAGO, ILLINOIS.

PISTON RING.

Application filed January 5, 1920. Serial No. 349,376.

*To all whom it may concern:*

Be it known that I, JOSEPH MAURICE LA COURSE, a citizen of the United States, residing at Chicago, in the county of Cook and State of Illinois, have invented certain new and useful Improvements in Piston Rings, of which the following is a description.

My invention belongs to that general class of devices known as piston rings and relates particularly to a ring constructed to prevent excess lubricating oil from entering the cylinder above the piston. The invention has among its objects the production of a device of the kind described that is simple, convenient, durable, efficient and satisfactory for use wherever found applicable. Many other objects and advantages of the construction herein shown and described will be obvious to those skilled in the art from the disclosure herein given.

To this end my invention consists of the novel construction, arrangement and combination of parts herein shown and described and more particularly pointed out in the claims.

Figure 1:
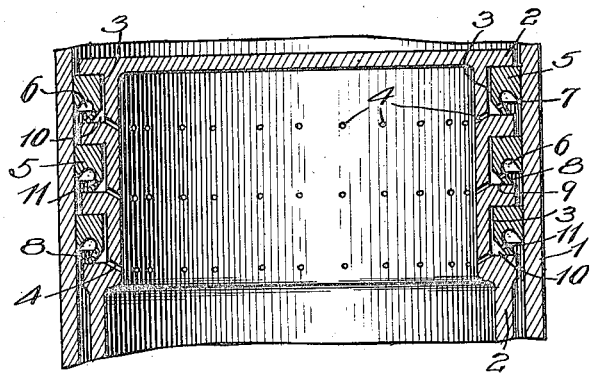
Figure 2:
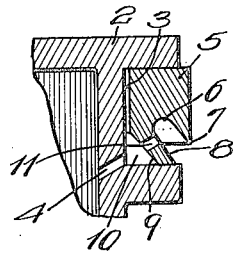
Figure 3:
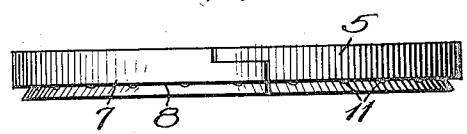
Figure 4:
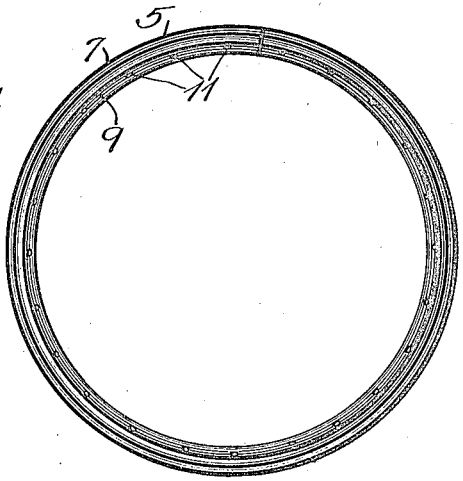

In the drawings, wherein like reference characters indicate like or corresponding parts, Figure 1 is a sectional view through a portion of a cylinder, piston, and rings, Figure 2 is an enlarged sectional view of a portion of the same, Figure 3 is a face elevation of the ring, and Figure 4 is a side elevation of the same.

Referring to the drawings, 1 represents a portion of the engine cylinder, and 2 the piston, the parts being of suitable material, and of the desired size, shape and construction. The piston is provided with one or more, as shown three, ring grooves 3. The piston is also provided with a plurality of holes or apertures 4 connecting one or more of the grooves 3 with the interior of the piston. Ordinarily it is preferred to place these apertures about one-half inch apart, but this, however, is a matter of preference and may vary for different types of engine construction.

Arranged to seat in the grooves 3 are the piston rings 5, of which there may be any number, depending on the number of grooves, which rings may be lapped in any desired manner to permit the usual resilient action, and hold the outer face of the ring firmly against the cylinder walls. In so far as the present invention is concerned, it is immaterial as to how the ends are lapped, the construction being, however, preferably such that the same is substantially leak proof. The ring is provided with the recess or groove 6 extending about the same, and formed in the ring so that a substantially sharp edge 7 is secured, as shown, extending downwardly, while the opposite side of the groove slopes as indicated as at 8, to the side of the groove, the ring being of sufficient width to substantially engage the ring with a substantially close fit at the opposite faces of the groove 3 in the piston. A portion of the ring at the inner face is beveled or cut away, as at 9, so as to substantially form a chamber 10 or series of chambers at the back of the ring, or bottom of the recess or groove. The ring is provided with the desired number of apertures or holes 11 connecting the chamber with the outside of the ring.

In operation, as the piston is reciprocated the surplus lubricating oil on the walls of the cylinder is scraped or picked up by the edge 7, and flows through the openings 11 into the chmaber 10, from whence it may escape into the interior of the piston through the openings 4 and back into the crank case. It will be particularly noted that with this construction the ring, in all other respects, operates as before. By preventing the passage of oil past the rings into the cylinder above the piston, forming of carbon above the piston is avoided, and the spark plugs are not easily or as quickly fouled. While I have mentioned and shown the three rings in the construction illustrated, obviously where more than one ring is employed, a portion of the rings used may be the ordinary or any preferred type, and only one of my improved type may be employed. This, however, is immaterial in so far as the construction of each particular ring is concerned.

Having thus described my invention, it is obvious that various immaterial modifications may be made in the same without departing from the spirit of my invention; hence I do not wish to be understood as limiting myself to the exact form, construc- tion, arrangement and combination of parts herein shown and described or uses mentioned.

What I claim as new and desire to secure by Letters Patent is:

1. The combination of a piston having a substantially rectangular ring groove and having openings extending from the groove through to the interior of the piston and a piston ring formed with a circumferential groove on the exterior periphery thereof, with one of the edges of the groove substantially sharp, the ring being cut away at the opposite side adjacent the bottom to form an oil receiving annular channel, and formed with apertures therein, connecting the groove with the opposite side at said cut away portions.

2. The combination of a piston having a rectangular ring groove therein and having openings extending from the groove through to the interior of the piston, and a piston ring formed with a circumferential groove on the exterior periphery thereof, with one of the edges of the groove substantially sharp, the ring being cut away at the opposite side adjacent the bottom and forming a triangular oil receiving space between said ring and groove, and apertures connecting the groove with the opposite side at said cut away portions.

In testimony whereof, I have hereunto signed my name in the presence of two subscribing witnesses.

JOSEPH MAURICE LA COURSE.

Witnesses:
BLANCHE CHALMERS,
BURTON U. HILLS.